United States Patent
Fackrell et al.

(10) Patent No.: US 6,889,489 B2
(45) Date of Patent: May 10, 2005

(54) MOWER WITH VERTICALLY MOVABLE PLATFORM

(75) Inventors: Willis Fackrell, Salem, OR (US); Bill Valov, Keizer, OR (US); C. Marrs Gist, Visalia, CA (US); Kevin Kling, McMinnville, OR (US); Roger Rivers, Yamhill, OR (US)

(73) Assignee: Monrovia Nursery Company, Woodlake, CA (US)

( * ) Notice: Subject to any disclaimer, the term of this patent is extended or adjusted under 35 U.S.C. 154(b) by 0 days.

(21) Appl. No.: 10/444,895

(22) Filed: May 23, 2003

(65) Prior Publication Data

US 2003/0196422 A1 Oct. 23, 2003

Related U.S. Application Data

(63) Continuation of application No. 09/845,886, filed on Apr. 30, 2001, now Pat. No. 6,609,356.

(51) Int. Cl.[7] ............................................. A01D 75/30
(52) U.S. Cl. .............................................. 56/6; 56/233
(58) Field of Search ............................ 56/6, 10.9, 11.9, 56/13.5, 13.8, 233, 234, 235, 231, 238

(56) References Cited

U.S. PATENT DOCUMENTS

| | | |
|---|---|---|
| 2,798,354 A | 7/1957 | O'Brien et al. |
| 3,832,835 A | 9/1974 | Hall et al. |
| 3,918,240 A | 11/1975 | Haffner et al. |
| 3,982,383 A | 9/1976 | Mott |
| 4,067,178 A | 1/1978 | Miller |
| 4,173,110 A * | 11/1979 | Hansen, Jr. ............... 56/10.2 R |
| 4,312,175 A | 1/1982 | Barnes |
| 4,395,865 A | 8/1983 | Davis, Jr. et al. |
| 4,570,425 A | 2/1986 | Carr |
| 4,777,787 A | 10/1988 | Warren |
| 4,871,027 A | 10/1989 | Lindstrom et al. |
| 4,969,533 A | 11/1990 | Holm et al. |
| 5,069,022 A | 12/1991 | Vandermark |
| 5,291,723 A | 3/1994 | Lindsey |
| 5,387,153 A | 2/1995 | Tanis |
| 5,430,999 A | 7/1995 | Grant |
| 5,797,793 A | 8/1998 | Matousek et al. |
| 5,865,020 A * | 2/1999 | Busboom et al. ........... 56/320.1 |
| 5,964,082 A * | 10/1999 | Wright et al. ................. 56/14.7 |
| 6,131,378 A | 10/2000 | Lees |
| 6,151,876 A | 11/2000 | Van Der Burg |
| 6,368,209 B2 | 4/2002 | Moster et al. |
| 6,530,200 B1 * | 3/2003 | Minoura et al. ............. 56/17.1 |
| 6,609,356 B2 * | 8/2003 | Fackrell et al. ................... 56/6 |

* cited by examiner

*Primary Examiner*—Meredith Petravick
(74) *Attorney, Agent, or Firm*—Christie Parker and Hale, LLP (57) ABSTRACT

A self propelled, steerable, vertically adjustable, hydraulicly driven, ganged mowing machine for trimming nursery products. The machine generally includes a horizontal platform that supports a staggered array of mower decks. Each mower deck is driven by a hydraulic motor operatively connected to a mower blade for trimming the nursery products. The platform is slideably connected to right and left vertically stationary frames such that the platform is vertically adjustable with respect to the ground, via a hydraulic cylinder interconnecting the platform and each frame. Each vertical frame includes an independently controllable hydraulically driven traction drive motor operably connected to a drive wheel for propelling the machine. The mowing machine also includes a prime mover. The prime mover drives a number of hydraulic pumps. At least one of the hydraulic pumps drives the hydraulic motors which drive the mower blades. At least one pump drives the traction motors mounted on the vertical frames, and at least one pump drives the hydraulic cylinders for vertically adjusting the platform. The mowing machine also includes a seat for a driver, and controls for operating the gas engine, traction motors, and for engaging the mowers. The mowing machine is self-braking.

19 Claims, 8 Drawing Sheets

MOWER WITH VERTICALLY MOVABLE PLATFORM

CROSS-REFERENCE TO RELATED APPLICATION

This application is a continuation of U.S. patent application Ser. No. 09/845,886, filed on Apr. 30, 2001, now U.S. Pat. No. 6,609,356.

BACKGROUND OF THE INVENTION

The present invention relates to ganged mowing machines in general, and more specifically to a hydraulically driven, self-propelled, ganged mowing machine with a vertically adjustable mower platform for particular use in cutting or pruning nursery products, such as shrubs, bushes, and the like.

A number of ganged mowing machines have been proposed in the past. The majority of these machines have been directed towards cutting large expanses of grass upon golf courses, parks, large estates, and roadsides. Typically, these machines are intended to be towed by a tractor where a power-take-off unit from the tractor provides the power required to run the mowers. A typical example of a towed ganged mower is U.S. Pat. No. 5,069,022 entitled "Gang Mower Apparatus," issued to Vandermark. This device features nine rotary mowers attached to a frame which is towed behind a tractor. The mowers are mechanically driven by means of shafts and belts via a mechanical power-take-off from the tractor. Each mower unit is liftable from a cutting position to a travel position via a hydraulic cylinder. By lifting the mower units during periods of travel between mowing sites, the trailer may be towed at a faster rate of speed than if the mower units were left in the cutting position. Hydraulic power to drive the lifting cylinders is provided via a fluid-power-take-off from the tractor. Each mower unit is designed to be independently movable with respect to the other mower units in order for each unit to more closely follow the terrain to be cut. The vertical height of the mowers with respect to the ground may be adjusted within a range of a few inches via an adjustable swivel wheel.

Ganged mowing machines of this type are unsuitable for the special needs of cutting nursery products. On a large expanse of lawn, a tractor may proceed directly in front of the mowers while cutting the grass without harming the lawn. This is not possible in a nursery setting as the tractor would crush the bushes and shrubs to be cut. In addition, towed mowers of the type discussed above have a limited vertical height adjustment. Typically, these mowers are designed to cut grass to a height of about one to three inches above the ground. While this is a desirable feature in cutting lawns, it is entirely unsuitable to cutting shrubs, bushes and other nursery products which often require trimming at a height within a range of two to three feet from the ground. Further, towed mowing machines typically suspend the mowers independently of each other so that the mower may closely follow the terrain. Again, while this feature is desirable in a grass cutting machine, it is undesirable in cutting nursery products. Nursery products are typically arranged in rows and are often potted. This arrangement renders independently suspended mowers impractical because the multiplicity of wheels and suspension members required would destroy or otherwise severely damage the nursery products.

Related machines such as "riding" lawn mowers are also known in the art. Some of these machines may incorporate more than one rotary mower blade. However, machines of this type suffer most of the same disadvantages associated with towed ganged mowers. What is needed therefore is a ganged mowing machine specifically developed for the needs of cutting or trimming nursery products. Ideally, such a machine would have a horizontal platform on which is mounted an array of ganged mowers. The platform should be comparatively wide so that the a large number of rows of nursery products may be cut or trimmed at one time. The mowing machine should have wheels only at the extreme ends of the platform to avoid trampling the shrubs, bushes, or plants to be cut. In addition, the mowing machine should be self-propelled to eliminate the need for a tractor. Further, the machine should be designed so that the mowers may adjust to a vertical height up to about three feet from the ground.

SUMMARY OF THE INVENTION

The exemplary embodiment of the present invention is a self propelled, steerable, vertically adjustable, hydraulicly driven, ganged mowing machine for cutting or trimming nursery products, such as shrubs, bushes, plants, and the like. The machine generally includes a rectangular horizontal platform where the platform supports a staggered array of mower decks and the machine's power and control devices. Each mower deck includes a hydraulic motor which is operatively connected to a mower blade for cutting or trimming nursery products. Preferably, the platform is comparatively long in width and comparatively short in depth.

The exemplary embodiment of the mowing machine further includes right and left vertical frame assemblies. The horizontal or mower platform is slidably connected to each frame assembly on its right and left sides respectively via a pair of slideways. The slideways include a pair of slides on each frame assembly and carriages mounted on the platform, where the carriages fit about the slides. Each vertical frame assembly is also interconnected with the platform via a hydraulic cylinder. The hydraulic cylinders are used to adjust the platform, and the mower decks mounted thereon, with respect to the ground. Each vertical frame assembly includes an independently controllable hydraulically driven traction drive motor operably connected to a drive wheel for propelling the machine. The mowing machine may be steered by increasing or decreasing the speed of one drive wheel relative to the other drive wheel.

As stated, in the exemplary embodiment, the platform carries the power and control devices for driving the machine's hydraulic systems. In general, these devices include a gasoline engine or prime mover. The prime mover drives a number of hydraulic pumps. At least one of the hydraulic pumps drives the hydraulic motors which drive the mower blades. At least one pump drives the traction motors mounted on the vertical frames, and at least one pump drives the hydraulic cylinders for raising the platform. The mowing machine also includes a seat for a driver, and controls for operating the gas engine, traction motors, and for engaging the mowers. The mowing machine is self-braking. These and other features of the invention will become more apparent from the following detailed description of the invention, when taken in conjunction with the accompanying exemplary drawings.

DETAILED DESCRIPTION OF THE INVENTION

Throughout this specification reference will be made to the right and left sides or ends of the ganged mowing machine of the present invention. The directions right and left are determined from the perspective of the driver, in accordance with typical automotive convention. The directions also correspond to the perspective of an individual looking at the back of the machine as shown in FIG. 2.

Figure 1A:
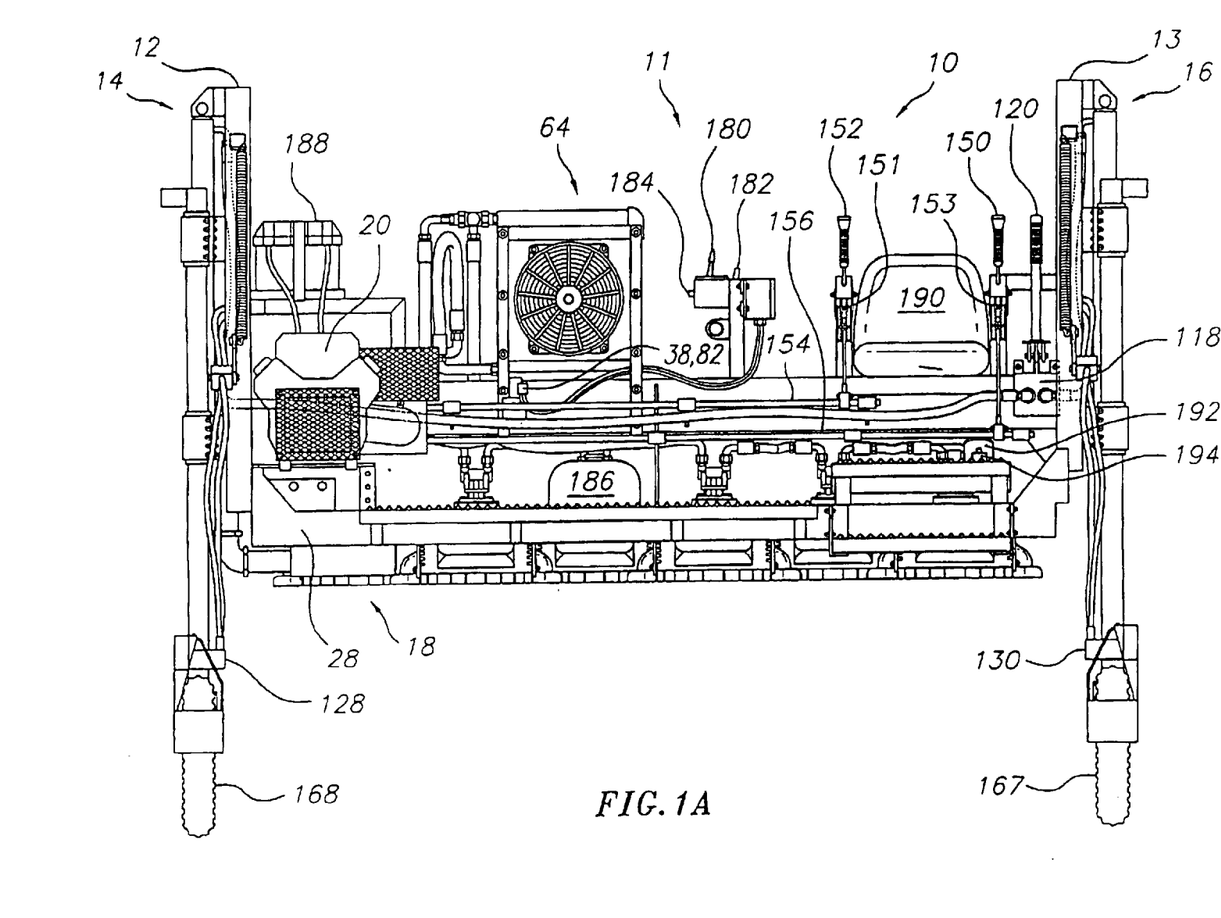
FIG. 1A is a front view of the self-propelled, ganged, mowing machine of the present invention.
Figure 1B:
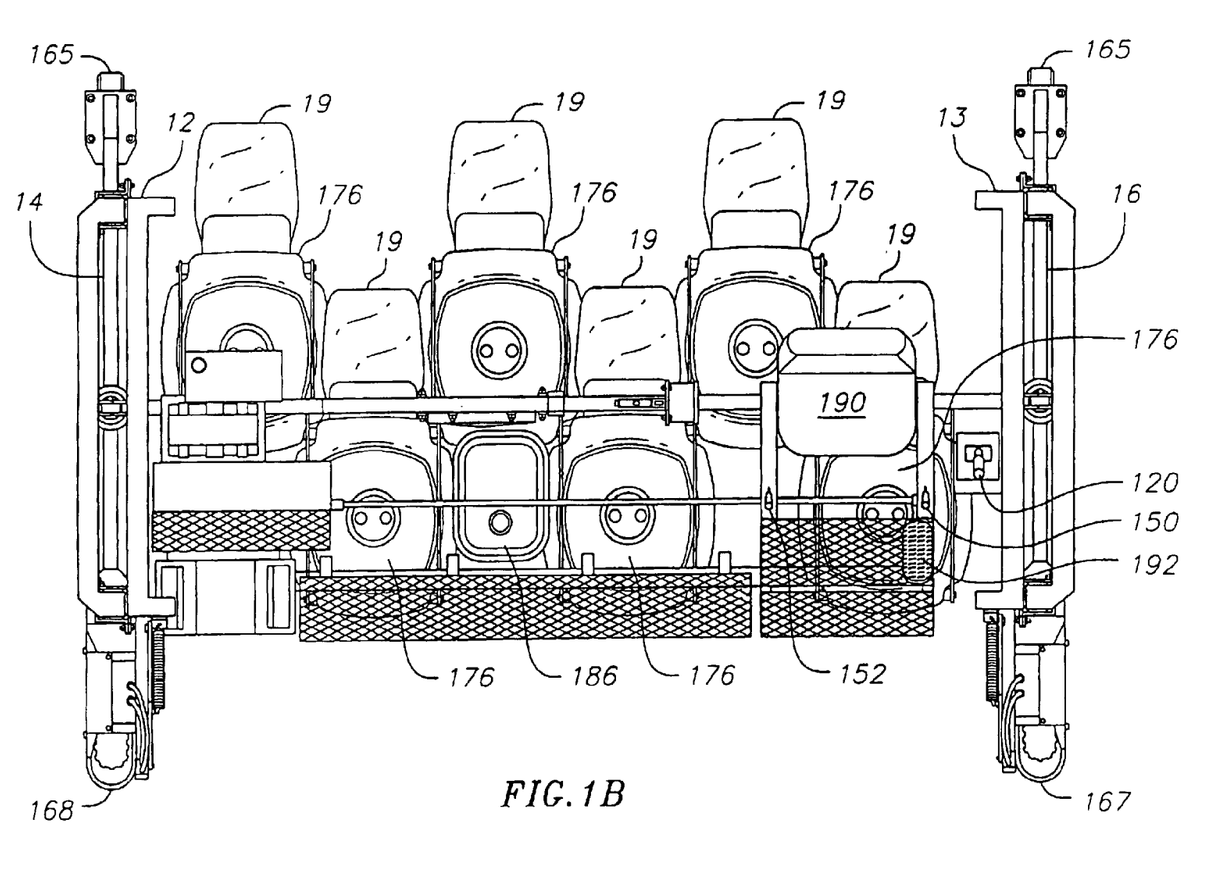
FIG. 1B is a schematic top view of the self-propelled, ganged, mowing machine shown in FIG. 1A.
Figure 2:
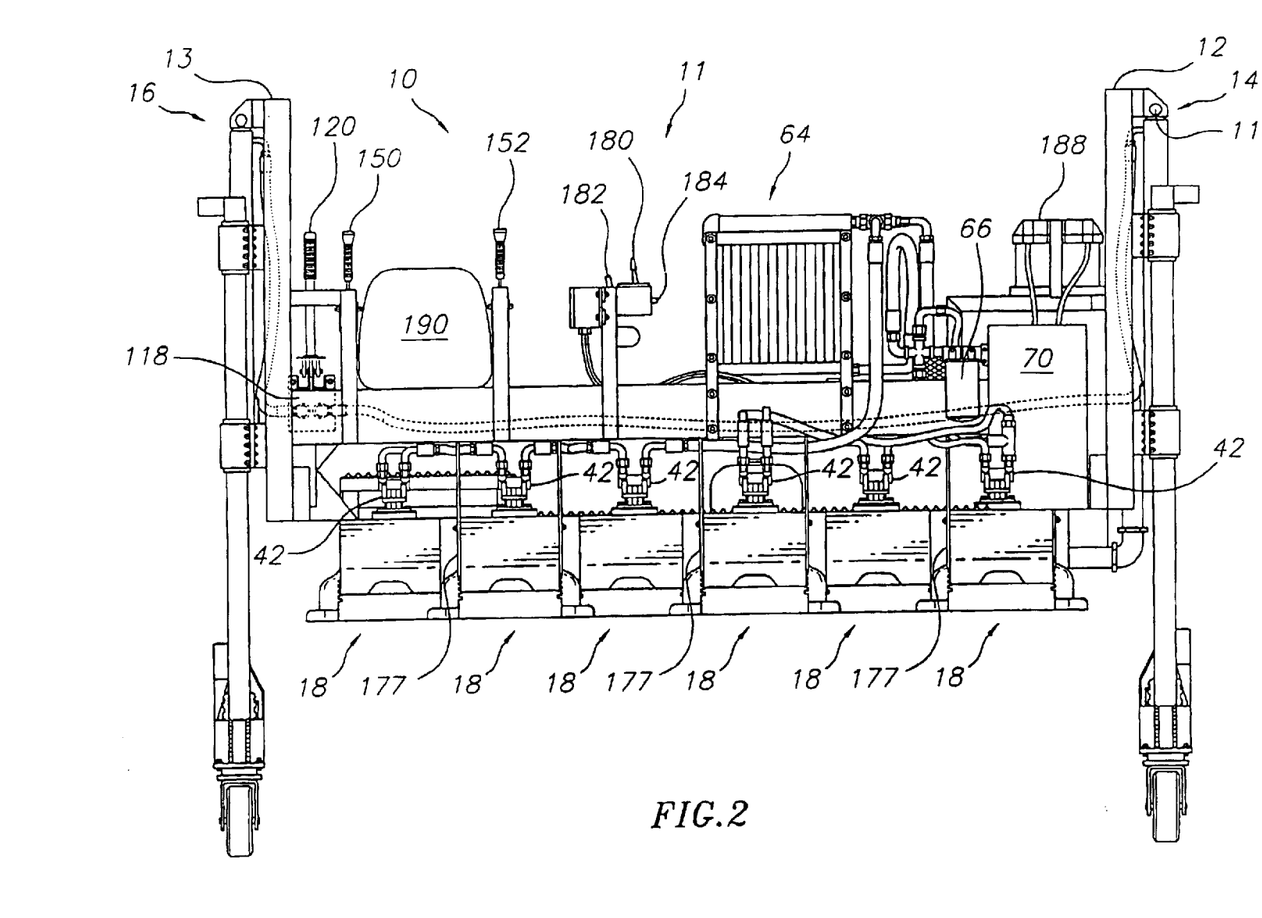
FIG. 2 is a back view of the self-propelled, ganged, mowing machine shown in FIG. 1.
Figure 3:
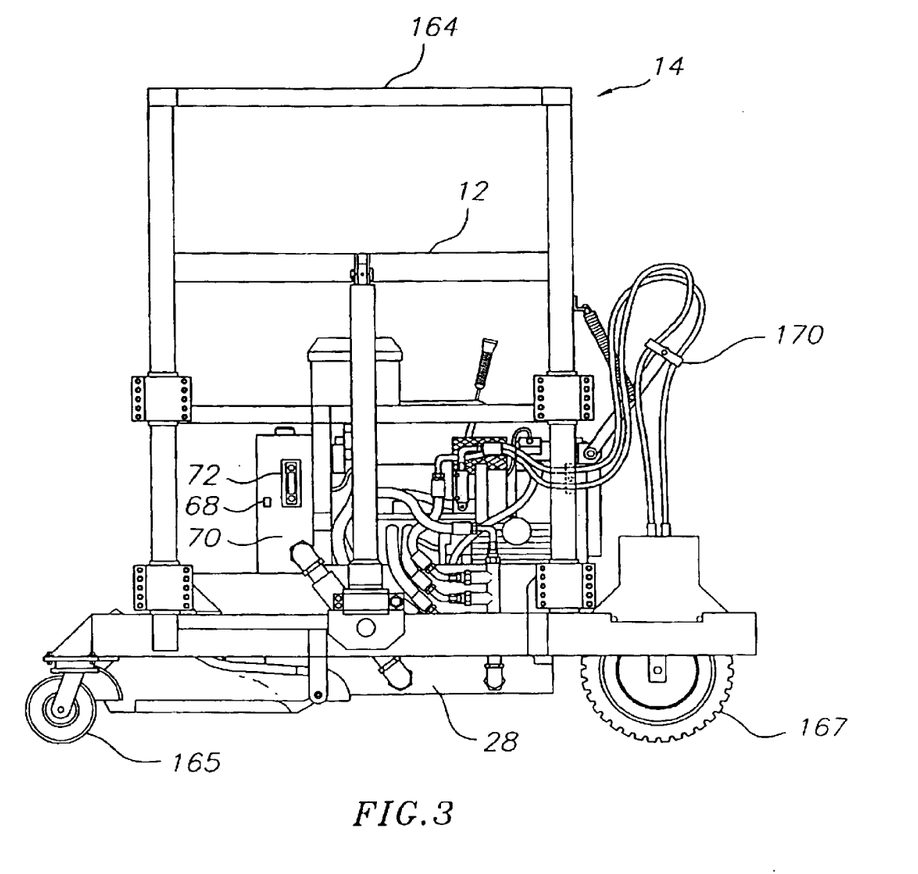
FIG. 3 is a side view of the self-propelled, ganged, mowing machine of FIG. 1, shown with the horizontal platform in a low position.
Figure 4:
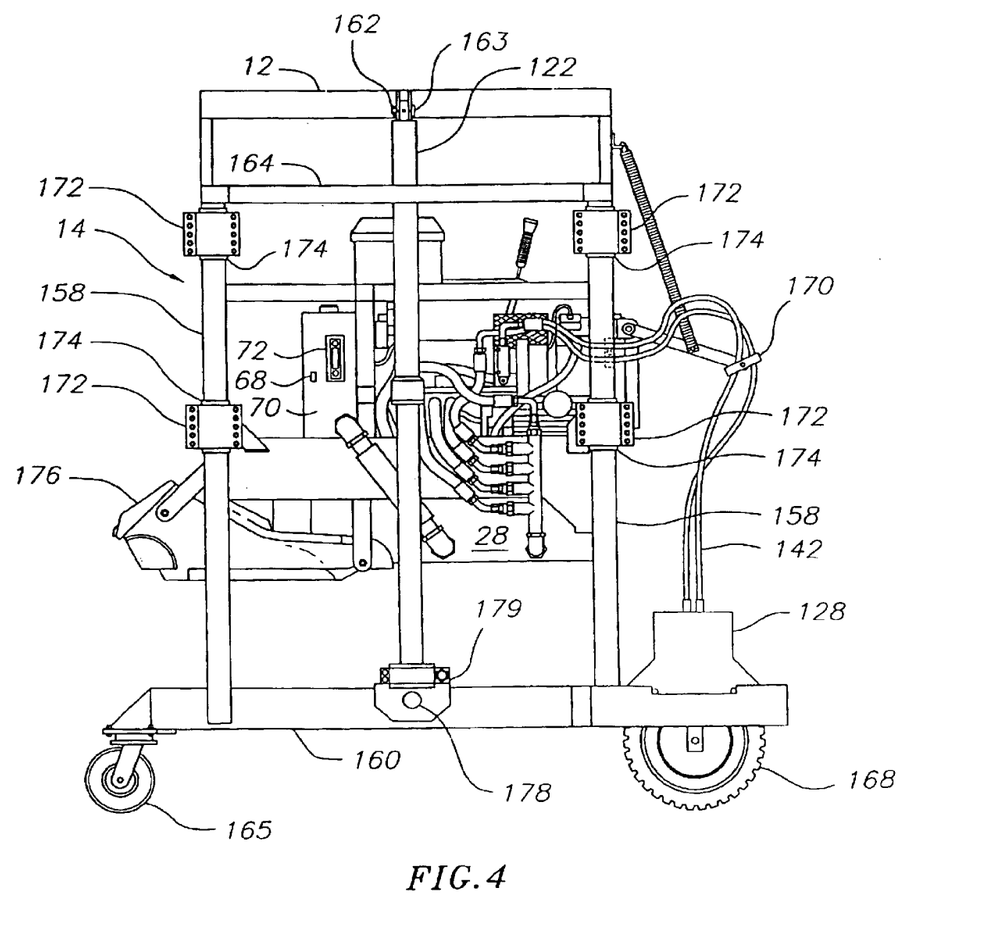
FIG. 4 is a side view of the self-propelled, ganged, mowing machine of FIG. 1, shown with the horizontal platform in a raised position.

Referring now to FIGS. 1A, 1B, and 2, front, top, and rear views respectively, of the ganged mowing machine 10 of the present invention are shown. The ganged mower comprises a generally rectangular, horizontal, mower platform 11, having right and left ends 12 and 13. The mower platform supports a plurality of mower decks 18, where each mower deck includes a mower housing 176 (best seen in FIG. 4), a hydraulic motor 42, and a mower blade 178 (shown in FIG. 6), which is operably connected to the hydraulic motor, and a cutter collection bag 19. The mower decks may be attached to the platform with brackets 177 (best shown in FIGS. 2 and 6) or by any other suitable means. The right and left ends of the mower platform are slidably connected to right and left vertical frame assemblies 14 and 16 respectively. The vertical height of the mower platform and consequently the mower decks, with respect to the ground, is adjustable by hydraulic means between a low position as shown in FIG. 3, and a high position as shown in FIG. 4. The vertical frame assemblies remain vertically stationary with respect to the ground. In the exemplary embodiment, the range of vertical adjustment between the high and low positions is 38 inches. Those skilled in the art will understand that by varying the size of the frames and the hydraulic cylinders, more or less adjustment may provided.

The right and left vertical frame assemblies 14 and 16 are mirror images of each other. Therefore, only one frame assembly need be described in detail. Referring now to FIG. 4, the right vertical frame assembly 14 includes a pair of slides 158 which are connected at one end to a base member 160 and are connected to an upper cross member 164 at another end. Connected to the base member is a hydraulicly driven traction drive motor 128 which is operably connected to a drive wheel 168. Also connected to the base member is a rear swivel wheel 165. The vertical frame assembly is slidably connected to the mower platform 11 by means of four carriage assemblies 172, where each carriage assembly includes bearings 174. The carriage assemblies 172 are mounted on the horizontal platform and fit about the slides 158. The slides, carriages, and bearings may be of any suitable material and cross-section. In the exemplary embodiment, the slides are formed from square steel tubing and the carriages are designed to match. Slideways of the type shown in the figures are known in the art and many alternative configurations are possible.

With continued reference to FIG. 4, interconnecting the vertical frame assembly 14 with the platform 11 is a hydraulic cylinder 122. The hydraulic cylinder is connected at a lower end to the frame at the base member 160, via a removable fitting 179. The fitting 179 is removably attached to the hydraulic cylinder by mechanical means and the fitting is connected to the base member by a single pin 178. The hydraulic cylinder is connected to the platform via a pin 163 which interfaces with a pin fitting 162 on the mower platform. Thus, in the event of a malfunction of the hydraulic cylinder, the cylinder may be "changed out" in the field by simply removing two pins and swapping in a new cylinder.

The frame assembly 14 also includes a hydraulic line retainer assembly 170 which comprises a spring and arm arrangement which keeps the hydraulic lines 142 and 144, which extend from the platform 11 to the traction motor 128, from becoming entangled with either the frame assembly or the mower platform, as the platform is adjusted from one vertical position to another. FIG. 3 depicts the position of the line retainer assembly when the platform is in a low position, while FIG. 4 depicts the retainer assembly's position when the platform is in a raised position.

Figure 7:
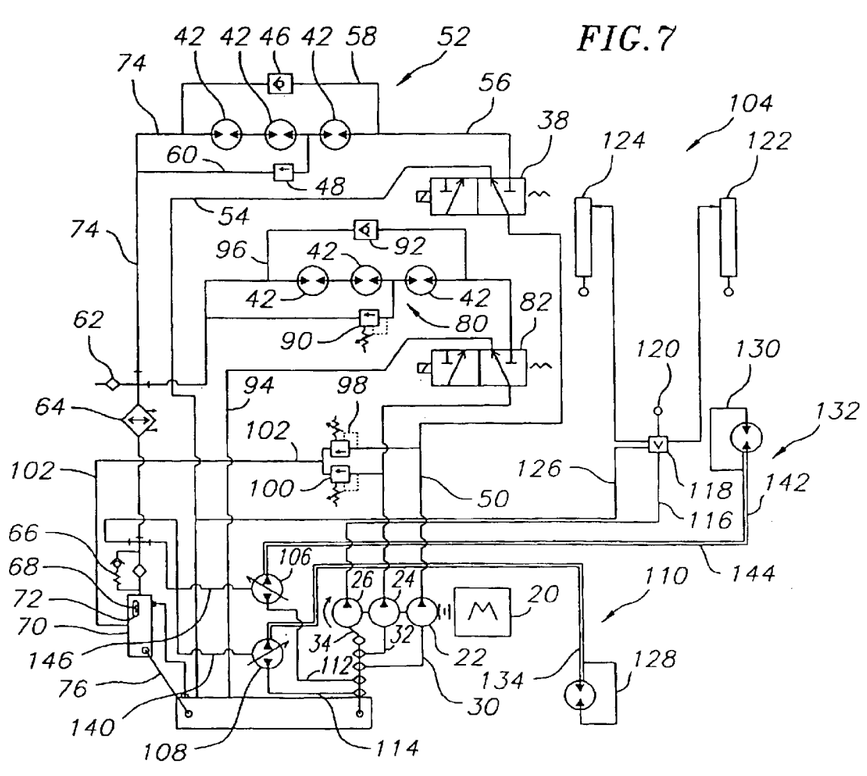
FIG. 7 is a schematic view of the hydraulic components incorporated in the machine shown in FIG. 1.

The operation of the hydraulic system of the present invention ganged mower 10 will now be explained with reference to FIG. 7. The ganged mower is powered by a prime mover or gasoline engine 20. The engine drives five hydraulic pumps where a first pump 22 drives a first pump circuit 52, where the circuit includes a set of the hydraulic motors 42, a second pump 24 drives a second pump circuit 80, which also includes a set of the hydraulic motors 42, a third pump 26 drives a hydraulic cylinder circuit 104, a fourth pump 106 drives a first traction motor circuit 110, and a fifth pump 108 drives a second traction motor circuit 132. The hydraulic pumps draw hydraulic fluid from a lower fluid supply reservoir or tank 28 (FIGS. 1 and 3–4), via pump supply hoses or lines 30, 32, 34, 112 and 114, respectively. The pump supply lines draw fluid from a main tank feed line 36. Preferably, the fluid supply tank is positioned vertically at a height above the pumps so that gravity will assist in feeding fluid to the pumps. In situations, such as in the exemplary embodiment, where packaging constraints require the use of more than one fluid supply tanks, it is preferable that at least one of the tanks be positioned higher than the pumps.

Figure 6:
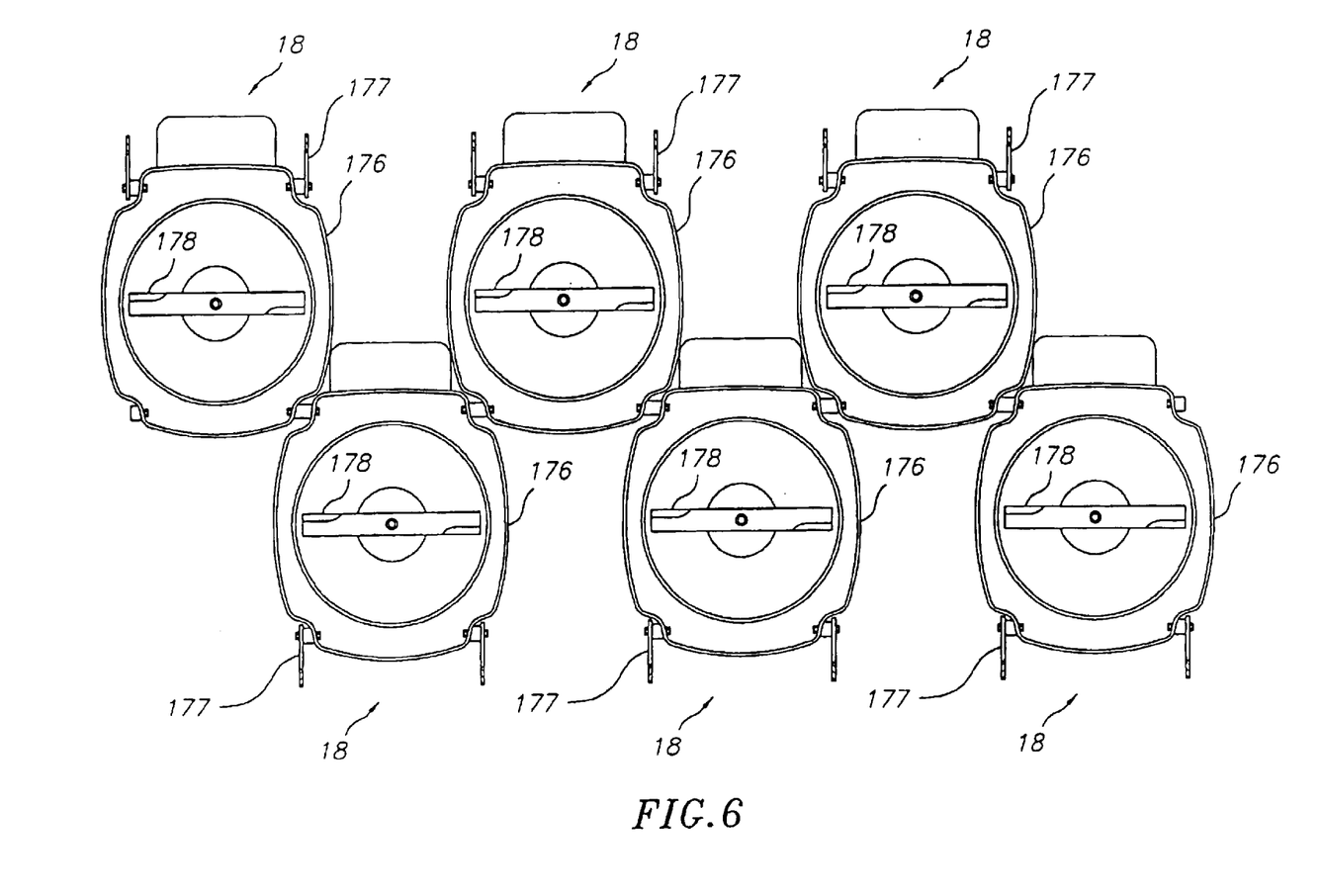
FIG. 6 is a schematic bottom view of the self-propelled, ganged, mowing machine of FIG. 1, showing the staggered arrangement of the mower decks.

The first hydraulic pump 22 drives the first pump circuit 52 which includes three series connected hydraulic motors 42. Each of the hydraulic motors is in turn mechanically connected to one rotating mower blade (FIG. 6). In more detail, the first pump supplies fluid, via line 50, to a solenoid valve 38. The solenoid valve is connected to a driver operated mower-drive foot pedal. The solenoid valve switches fluid between two lines. In the valve's non-actuated state, it directs fluid through line 54, which is a fluid return line leading back to the fluid supply tank 28. In the valve's actuated state, fluid is diverted to line 56, which feeds the three motors 42. Thus, the solenoid valve provides a safety function in that the hydraulic motors which drive the mower blades only operate when the driver has his foot on the foot pedal. When the driver removes his foot from the pedal, the pressurized fluid is switched to the return line 54, cutting of the fluid supply to the mower blade drive motors.

It should be noted that due to the momentum of the rotating mower blades 178, each blade drive motor 42 does not immediately stop rotating as soon as fluid pressure is switched from the feed line 56 to the return line 54. The momentum of each rotating blade tends to keep the hydraulic motor to which the blade is connected rotating for a finite period of time after the fluid supply is switched off. To keep the series connected motors from running dry after fluid supply shutoff, a one way check valve 46 is incorporated in line 58. This line and the check valve form a fluid loop which continues to supply fluid until the blades and consequently the motors stop rotating. Preventing the motors from running dry is important because a dry motor quickly builds up excessive heat which may lead to motor seal and/or bearing failure over time.

The first pump circuit also includes a pressure relief valve 48 which is located between the first and second of the three series connected motors 42. The pressure relief valve prevents excessive pressure buildup in the motor supply line 56 by bleeding fluid to a bleed line longitudinal axis 60 of the secondary pipeline 20 when the supply line pressure exceeds a predetermined level. In the exemplary embodiment, the pressure relief valve bleeds fluid when the line pressure exceeds 1000 psi. Fluid exits the first pump circuit 52 via a main fluid return line 74. In the main return line 74 is a thermocouple a line 62 that is perpendicular to the outer wall 50 of the double walled containment sump 22 which is electrically connected to temperature gauge 68. After the thermocouple, the return line 74 enters an oil cooler unit 64 (FIGS. 1 and 2). The main return line continues to an oil filter 66 (FIG. 2) and terminates at an upper oil tank 70 (FIGS. 2 and 3–4). The upper oil tank is connected to the lower oil tank 28 via a feed line 76. The upper tank includes an oil level gauge in the form of a sight glass 72 (FIGS. 3–4). In the exemplary embodiment, the temperature gauge is mounted to the upper oil tank (FIGS. 3–4).

The ganged mower of the present invention 10 also includes a second pump circuit 80 which drives another set of three series connected hydraulic drive motors 42, each of which is mechanically connected to one mower blade 178. The second pump circuit functions identically to the first pump circuit. Therefore, a detailed explanation is not required and it is sufficient to identify the component parts here. In the second pump circuit, the gasoline engine 20 drives the hydraulic pump 24. The pump 24 delivers pressurized fluid to a solenoid valve 82, which like the solenoid valve 38 of the first pump circuit is connected to the driver operated foot pedal. It should be noted that the solenoid valves 82 and 38 of the first and second pump circuits are ganged to the same foot pedal. Thus, both sets of three mowers shut down and turn on at the same time with actuation of the foot pedal.

Like the solenoid valve 38, the valve 82 is switchable between two lines. One line diverts fluid to a fluid bypass line 94 which is a return line to the lower fluid tank 28. The other line supplies pressurized fluid to the three motors 42. The motors are connected in series and the circuit includes a one way check valve 92 installed in a loop line 96. The check valve and loop line function identically to their counterparts, check valve 46 and line 58, in the first pump circuit. The second pump circuit also includes a pressure relief valve 90 which vents fluid to the main return line 74. The hydraulic motors 42 of the second pump circuit also exhaust fluid to the main return line 74, which is shared with the first pump circuit.

Located between the pump 22 and the solenoid 38 of the first pump circuit 52 is a pressure relief valve 98. This valve functions to bleed off excess pressure in the first pump circuit and is primarily effective when the solenoid 38 is switched to the bypass line 54. The pressure relief valve 98 bleeds fluid to a return line 102 which drains into the upper fluid tank 70.

Located between the pump 24 and the solenoid 82 of the second pump circuit 80 is a pressure relief valve 100. Like the pressure relief valve 98 of the first pump circuit, the pressure relief valve 100 functions to bleed off excess pressure in the second pump circuit and is primarily effective when the solenoid 82 is switched to the bypass line 94. The pressure relief valve 100 diverts fluid to the return line 102, which is shared with the pressure relief valve 98 of the first pump circuit.

The hydraulic cylinder circuit 104 includes the third pump 26 which supplies pressurized fluid, via line 116, to a control valve 118. The control valve 118 directs fluid to a pair of right and left hydraulic cylinders 122 and 124. The control valve is operated by a lever 120. When the control valve is shifted to an on position, pressurized fluid raises the mower platform 11. Once a desired platform height is reached, the valve is switched to a neutral position which maintains fluid pressure and thereby the platform's height. When the valve is shifted to a release position, pressurized fluid is diverted to a return line 126, which connects to drain line 54, through which the diverted fluid returns to the lower supply tank 28. It should be noted that in the exemplary embodiment the hydraulic cylinders are only raised by hydraulic pressure. When the control valve is shifted to the release position, relieving the pressure, the weight of the mower platform forces the cylinder rams to slide downwardly within their bores. Thus, fluid accumulated within the cylinders is forced through the return line 126 to the return line 54 and back to the lower tank by the pressure exerted on the rams due to the weight of the mower platform.

The hydraulic system of the present invention ganged mower 10 further includes the first traction motor drive circuit 110. In this circuit, the gasoline motor 20 drives the hydrostatic piston pump 108. A hydrostatic pump is a particularly smooth running pump which is well suited to providing fluid at a constant high pressure level. Such pumps are known to those skilled in the art. The pressure output of the pump 108 is controllable by means of a valve built into the pump. The pump valve may be controlled by either electrical or mechanical means. In the exemplary embodiment, driver operable means to adjust the pump 108 is provided and will be discussed later. The piston pump is connected in fluid circuit, via lines 134 and 136 with a traction motor 128, which drives the left side drive wheel 167. Line 134 feeds high pressure fluid to the traction motor and line 136 is the fluid return to the pump. One particular feature of the hydrostatic pump is that the pump hydrostatically locks upon shutoff and thereby acts as a brake. For example, if the ganged mower of the present invention is parked on a slope, the weight of the mower will tend to roll the mower down the slope, however due to the hydrostatic locking effect of the hydrostatic pump, fluid is prevented from being pumped out of the traction motor and thus any unintended rolling motion of the mower is prevented. The hydrostatic piston pump draws fluid from the lower tank via line 114 and returns fluid to the upper tank via line 140 which connects to the main fluid return line 74.

The second traction motor circuit 132 drives the right side drive wheel 168 and operates identically to the first traction motor circuit 110. Therefore detailed description is not required and it is sufficient to identify the components here. The second traction motor circuit includes a hydrostatic piston pump 106, which is controllable via a valve incorporated within the pump. This valve may be controlled by electrical or mechanical means disposed near the drivers seat. The piston pump 108 is connected in fluid circuit with a traction motor 130, via feed line 142 and return line 144. The pump draws fluid from the lower supply tank 28 via the supply line 112. The pump returns fluid to the upper supply tank 70 via a line 146 which connects to the main drain line 74. It should be noted that the first and second traction motor circuits are independent of each other and therefore each traction motor may be run independently of the other.

In this specification, reference has been made to hydraulic piston pumps, rotary pumps, hydraulic motors, traction motors, pressure relief valves, control valves, and other hydraulic devices. Each of these devices, when viewed individually, is known to those skilled in the art. However, the fluid circuit described above to operate the ganged mower of the present invention is a novel arrangement of these devices.

As will be appreciated by those skilled in the art, more than one physical arrangement for the devices in the above described exemplary circuits are possible. With this in mind, the particular physical arrangement of the exemplary embodiment of the mower platform 11, of the present invention ganged mower 10, will be described in greater detail. Referring now to FIG. 6, it is important to note that physically, each of the hydraulic circuits, 52 and 80, corresponds to a first and a second row of three mower decks 18 and that the two rows of mower decks are arrayed in a staggered horizontal arrangement. In other words, a second row of mower decks is positioned behind the first row and the decks of the second row are offset from the decks of the first row. The staggered arrangement serves to prevent gaps in the cutting path as each rotating blade 178 slightly overlaps the path of the blade of the next staggered adjacent deck. Those skilled in the art will appreciate that this concept may be expanded to more than two staggered rows of mower decks with more than three decks per row.

It should also be noted that in the exemplary embodiment, the mower platform 12 is comparatively wide so that a large number of rows of nursery products may be cut or trimmed at one time. In addition, the drive wheels 167 and 168 and the trailing wheels 165 are placed at the extreme ends of the platform to avoid trampling the shrubs, bushes, or plants to be cut.

Figure 5:
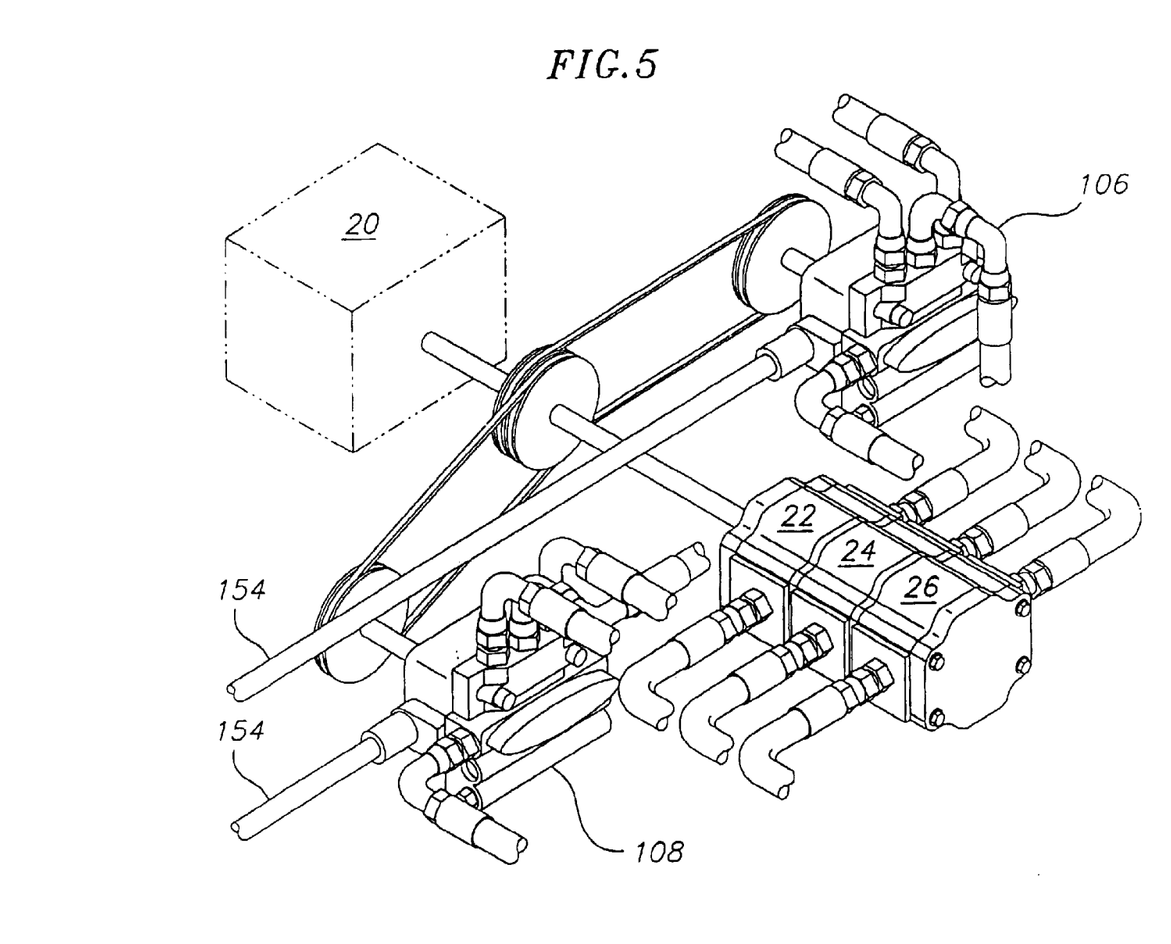
FIG. 5 is a partial top view, taken along line a—a, of the self-propelled, ganged, mowing machine of FIG. 1.

Referring now to FIGS. 1 and 5, the prime mover 20 of the exemplary embodiment is a 24 horsepower horizontal crankshaft gasoline engine. Engine associated components include the fuel tank 186, the battery box 188, and the engine operating controls to be discussed below. The hydraulic pumps 22, 24, and 26 are staged gear pumps which are directly driven by the engine crankshaft (best seen in FIG. 5). The hydrostatic pumps 106 and 108 are driven from the crankshaft by means of belts and pulleys (FIG. 5). The arrangement of the pumps shown in FIG. 5 corresponds to the exemplary embodiment of the mowing machine. Other arrangements, pump types, and means for driving the pumps are known in the art and may be substituted for those shown here.

Referring again to FIG. 1, several controls are required to operate the ganged mower 10. The ganged mower includes a seat 190 for the driver. The engine operating controls are located near the seat and include a key-type starting switch 184, a manul choke control 182, and a throttle lever 184. Engine starting and operating controls are well known in the art and require no elaboration here. The engine 20 is intended to be operated at a constant speed which preferably corresponds to a speed where the engine achieves maximum fuel efficiency.

With continued reference to FIG. 1, as described, forward motion of the machine is achieved via the right and left traction motors 128 and 130. These motors are driven by the right and left hydrostatic pumps 106 and 108. The output of the pumps, and therefore the speed of the traction motors, is controlled by a control valve built into each pump. Therefore, it is necessary to supply the driver with a means to control these remotely located pumps. In the exemplary embodiment, driver control of the pumps is provided by right and left control levers 152 and 150 which disposed on the right and left sides of the seat respectively. The right and left control levers are connected via mechanical linkages 151 and 153 respectively, to control rods 154 and 156, respectively. Control rod 154 is connected to the control valve on the right hydrostatic pump 106 and control rod 156 is connected to the left hydrostatic pump 108. As described, each traction motor operates independently of the other. Therefore, to engage the machine in forward motion the driver must push forward on each lever a roughly equal amount. The machine may be turned to one side or another by stopping and applying power to only one wheel of the machine. The machine may be turned during forward motion by creating a speed differential between the two driving wheels. It should also be noted that the hydrostatic pumps are reversible and thus the built in control valves have clockwise, counterclockwise, and neutral positions. Thus, the ganged mower may be driven in reverse by pulling backwardly on the control levers such that the levers rotate the pump control valves through their neutral positions and thereby cause the traction motors to reverse rotation. For the exemplary embodiment, the maximum over the ground speed is about 4–5 miles per hour.

As described previously, the height of the platform may be adjusted by actuating the control lever 120 disposed adjacent to the control lever 150. In the exemplary embodiment, the minimum cutting height of the mower decks is about seven inches vertically off the ground, while the maximum height is about 45 inches off the ground. The last driver operated control is the foot pedal 192 which actuates the solenoids 38 and 82, via a switch 194 which is electrically connected to the solenoids. The switch and foot pedal are best seen in FIG. 1.

In preparing to operate the ganged mower of the present invention 10, the operator will preferably overlook the area to be pruned to check for any obstacles that might interfere with the mower decks 18 and potentially pose a hazard. Prior to starting the engine 20, the operator should check to see that the gas tank 186 is full; that the upper fluid tank 70 is full, via the sight glass 72; that all electrical and hydraulic lines are in good condition; and that the tires are inflated and in good condition. The operator should then start the engine, via the key start 184. Preferably, the engine should be allowed to warm up at idle for about 2 minutes. The manual choke 184 may need to be adjusted during this period. After warm up, the engine may be brought to operating speed, via the throttle lever 180. Prior to pruning, a plot of nursery products the operator should engage the mower decks 18 by pushing the foot pedal 192. The decks should be engaged for about 10–15 seconds to allow the hydraulic motors to warm up to operating temperature. Subsequently, the operator may proceed to trim a plot of nursery products.

While only the presently preferred embodiments have been described in detail, as will be apparent to those skilled in the art, modifications and improvements may be made to the system and method disclosed herein without departing from the scope of the invention. For example, the hydraulicly powered components of the mowing machine may be replaced with mechanical or electrically driven devices which serve the same function. Further the horizontal mower blades may be replaced with reel-type mower blades. Accordingly, it is not intended that the invention be limited except by the appended claims.

What is claimed is:

1. A self propelled mowing machine for the trimming of nursery products comprising:

right and left vertical frames;

a mower platform attached between the vertical frames, the mower platform being vertically adjustable with respect to the vertical frames and the ground and including at least one mower deck mounted for vertical movement with the platform and extending in a horizontal plane for trimming a plurality of nursery products; and a motor driven driving member corresponding to each vertical frame, wherein at least one motor for driving the driving members is carried on the mowing machine.

2. The mower machine of claim 1, wherein the at least one mower deck comprises a plurality of mower decks extending on a horizontal plane.

3. The self propelled mowing machine of claim 1, wherein the vertical adjustment is motor driven.

4. The self propelled mowing machine of claim 1, further comprising a controller for the vertical adjustment of the platform.

5. The self propelled mowing machine of claim 2, wherein the mower decks are arranged in staggered rows.

6. The self propelled mowing machine of claim 2, wherein the mower decks are arranged in a first row and a second row, wherein the second row is arrayed behind the first row and the decks of the second row are horizontally offset from the decks of the first row.

7. The self propelled mowing machine of claim 6, wherein each row includes three mower decks.

8. The self propelled mowing machine of claim 1, wherein the mower platform is disposed in a lateral space between the vertical frames, such that when the mower platform is passed over the plurality of nursery products for trimming, the vertical frames straddle the plurality of nursery products.

9. The self propelled mowing machine of claim 1, further comprising a cutter collection bag attached to the at least one mower deck for collecting the nursery product trimmings.

10. The mower machine of claim 1, further comprising an operator station for an operator of the machine carried on the platform for movement up and down with the platform.

11. The mower machine of claim 1, wherein the mower deck is operable during the driving of the machine by the at least one motor for driving the driving members, such that the mower deck trims the plurality of nursery product while the machine is driven by said at least one motor.

12. A self propelled mowing machine for the trimming of nursery products comprising:

right and left vertical frames; and a mower platform having a right end and a left end, wherein the right and left frames are slidably connected to the right end and the left end, respectively, of the mower platform, the platform being vertically adjustable with respect to the ground;

a plurality of mower decks, vertically movable with the platform, extending in a horizontal plane for trimming a plurality of nursery products;

control means for control of the self-propelled mowing machine; and at least one ground drive motor carried by the mowing machine for propelling the mowing machine.

13. The self propelled mowing machine of claim 12, further comprising a driving member corresponding to each vertical frame and driven by the at least one ground drive motor.

14. The self propelled mowing machine of claim 12, comprising a motor carried by at least one of the frames for vertically adjusting the mower platform.

15. The self propelled mowing machine of claim 14, further comprising a controller for the motor for vertical adjustment.

16. The self propelled mowing machine of claim 12, further comprising at least one hydraulic cylinder interconnected between each frame and the mower platform, and operatively connected to the control means.

17. The self propelled mowing machine of claim 12, wherein each mower deck comprises a housing, a hydraulic motor and a blade, the hydraulic motor being operatively connected to the control means.

18. The self propelled mowing machine of claim 12, wherein the mower platform is disposed in a lateral space between the vertical frames, such that when the mower platform is passed over the plurality of nursery products for trimming, the vertical frames straddle the plurality of nursery products.

19. The self propelled mowing machine of claim 12, further comprising a cutter collection bag attached to each mower deck for collecting the nursery product trimmings.

* * * * *

UNITED STATES PATENT AND TRADEMARK OFFICE
CERTIFICATE OF CORRECTION

PATENT NO. : 6,889,489 B2  Page 1 of 1
DATED : November 23, 2004
INVENTOR(S) : Fackrell et al.

It is certified that error appears in the above-identified patent and that said Letters Patent is hereby corrected as shown below:

<u>Title page,</u>
Item [57], ABSTRACT,
Line 1, delete "hyrdraulicly", insert -- hydraulically --.
Line 7, delete "slideably", insert -- slidably --.

<u>Column 10,</u>
Line 2, delete "product", insert -- products --.

Signed and Sealed this

Twenty-first Day of March, 2006

JON W. DUDAS
*Director of the United States Patent and Trademark Office*

UNITED STATES PATENT AND TRADEMARK OFFICE
CERTIFICATE OF CORRECTION

PATENT NO. : 6,889,489 B2
DATED : May 10, 2005
INVENTOR(S) : Fackrell et al.

It is certified that error appears in the above-identified patent and that said Letters Patent is hereby corrected as shown below:

<u>Title page,</u>
Item [57], ABSTRACT,
Line 1, delete "hyrdraulicly", insert -- hydraulically --.
Line 7, delete "slideably", insert -- slidably --.

<u>Column 10,</u>
Line 2, delete "product", insert -- products --.

This certificate supersedes Certificate of Correction issued March 21, 2006.

Signed and Sealed this

Thirtieth Day of May, 2006

JON W. DUDAS
*Director of the United States Patent and Trademark Office*